United States Patent
Somerville

(10) Patent No.: US 9,542,355 B2
(45) Date of Patent: Jan. 10, 2017

(54) METHOD FOR RECALIBRATING COORDINATE POSITIONING APPARATUS

(75) Inventor: Leo Christopher Somerville, St. Charles, IL (US)

(73) Assignee: RENISHAW PLC, Wotton-under-Edge (GB)

( * ) Notice: Subject to any disclaimer, the term of this patent is extended or adjusted under 35 U.S.C. 154(b) by 971 days.

(21) Appl. No.: 13/704,861

(22) PCT Filed: Jul. 5, 2011

(86) PCT No.: PCT/GB2011/001012
§ 371 (c)(1),
(2), (4) Date: Dec. 17, 2012

(87) PCT Pub. No.: WO2012/004555
PCT Pub. Date: Jan. 12, 2012

(65) Prior Publication Data
US 2013/0090878 A1    Apr. 11, 2013

Related U.S. Application Data

(60) Provisional application No. 61/362,067, filed on Jul. 7, 2010.

(30) Foreign Application Priority Data

Aug. 20, 2010    (GB) .................................. 1013938.4

(51) Int. Cl.
*G06F 15/00*    (2006.01)
*G01B 21/04*    (2006.01)

(52) U.S. Cl.
CPC ............. *G06F 15/00* (2013.01); *G01B 21/042* (2013.01)

(58) Field of Classification Search
CPC ...... G01B 21/042; G01B 9/0205; G06F 15/00
See application file for complete search history.

(56) References Cited

U.S. PATENT DOCUMENTS

| | | | |
|---|---|---|---|
| 5,138,563 A | 8/1992 | Debitsch et al. | |
| 5,461,797 A * | 10/1995 | Royer | G01B 5/202 33/501.14 |

(Continued)

FOREIGN PATENT DOCUMENTS

| | | |
|---|---|---|
| CN | 1695036 A | 11/2005 |
| CN | 101166953 B | 12/2010 |

(Continued)

OTHER PUBLICATIONS

Unknown, Lecture L3—Vectors, Matrices and Coordinate Transformations, 2009, pp. 1-16.*

(Continued)

*Primary Examiner* — Mischita Henson
(74) *Attorney, Agent, or Firm* — Oliff PLC

(57) ABSTRACT

A method and corresponding apparatus are described for recalibrating coordinate positioning apparatus after a disturbance, such as a stylus replacement. The coordinate positioning apparatus includes a platform, a measurement probe and a probe head for reorienting the measurement probe relative to the platform. A calibration data set is taken for the coordinate positioning apparatus that includes datum data for a plurality of orientations of the measurement probe. The datum data includes at least first datum data for a first nominal orientation of the measurement probe. After a disturbance to the coordinate positioning apparatus, the calibration data set is updated by acquiring one or more position measurements and calculating a first correction from the one or more position measurements. The first correction describes any change in the first datum data following the disturbance and is used to update the datum (Continued)

Figure 1:
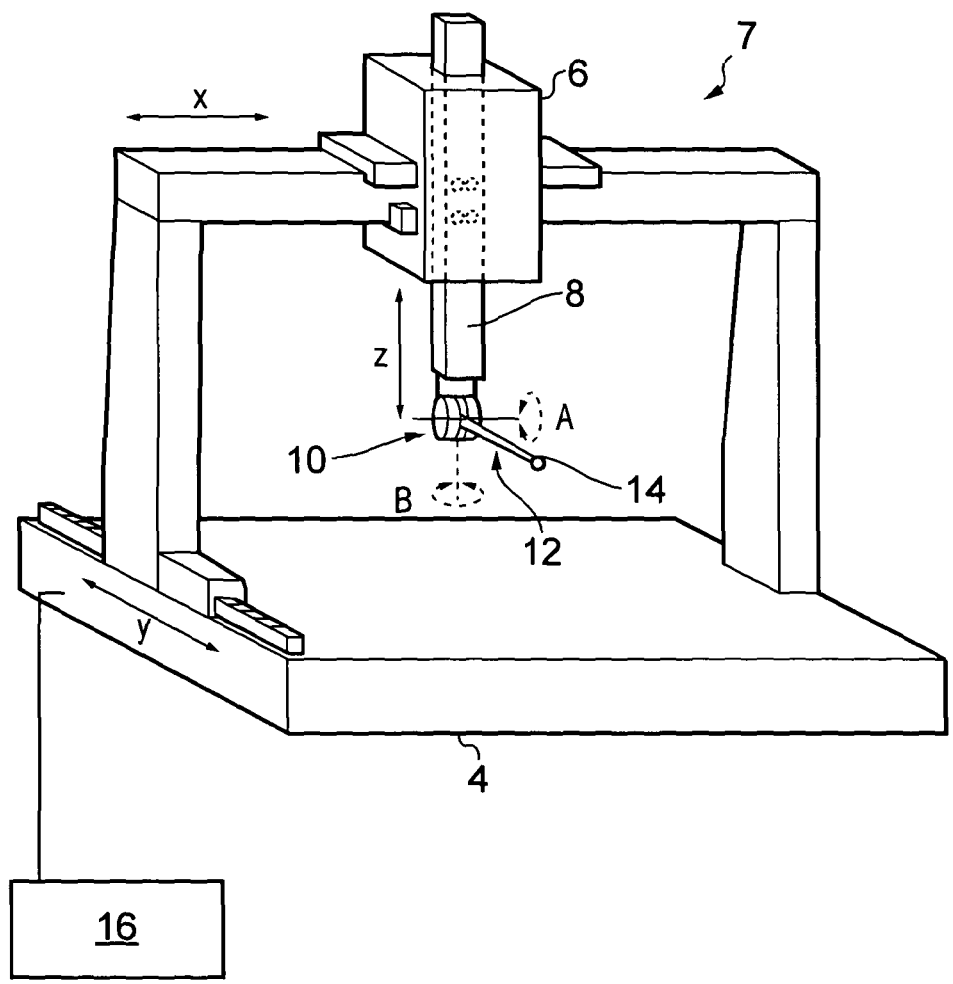

data for plurality of different orientations of the measurement probe. Corresponding apparatus is also described.

16 Claims, 4 Drawing Sheets

(56) References Cited

U.S. PATENT DOCUMENTS

| | | | |
|---|---|---|---|
| 7,293,365 | B2 | 11/2007 | McMurtry et al. |
| 2003/0069708 | A1 | 4/2003 | Noda et al. |
| 2003/0167103 | A1 | 9/2003 | Tang et al. |
| 2005/0256672 | A1 | 11/2005 | McMurtry et al. |
| 2006/0266100 | A1* | 11/2006 | McMurtry .............. G01B 3/30 73/1.79 |
| 2007/0034731 | A1* | 2/2007 | Falco ................ A61B 19/5244 244/3.1 |
| 2008/0256814 | A1 | 10/2008 | Pettersson |
| 2009/0002486 | A1 | 1/2009 | Fricke et al. |
| 2009/0090013 | A1 | 4/2009 | Hicks |

FOREIGN PATENT DOCUMENTS

| | | |
|---|---|---|
| EP | 0 759 534 A2 | 2/1997 |
| EP | 1 596 160 A1 | 11/2005 |
| JP | 2005-531765 A | 10/2005 |
| JP | 2009-288227 A | 12/2009 |
| WO | WO 00/25087 A1 | 5/2000 |
| WO | WO 02/073128 A1 | 9/2002 |
| WO | WO 2006/114603 A2 | 11/2006 |
| WO | WO 2007/125306 A1 | 11/2007 |

OTHER PUBLICATIONS

Nov. 12, 2010 British Search Report issued in British Patent Application No. GB1013938.4.
Nov. 25, 2011 International Search Report issued in International Patent Application No. PCT/GB2011/001012.
Nov. 25, 2011 Written Opinion of the International Searching Authority issued in International Patent Application No. PCT/GB2011/001012.
Nov. 3, 2014 Office Action issued in Chinese Patent Application No. 201180032328.6.
Dec. 22, 2015 Office Action issued in Japanese Application No. 2013-517517.
Apr. 21, 2015 Office Action issued in Japanese Patent Application No. 2013-517517.

* cited by examiner

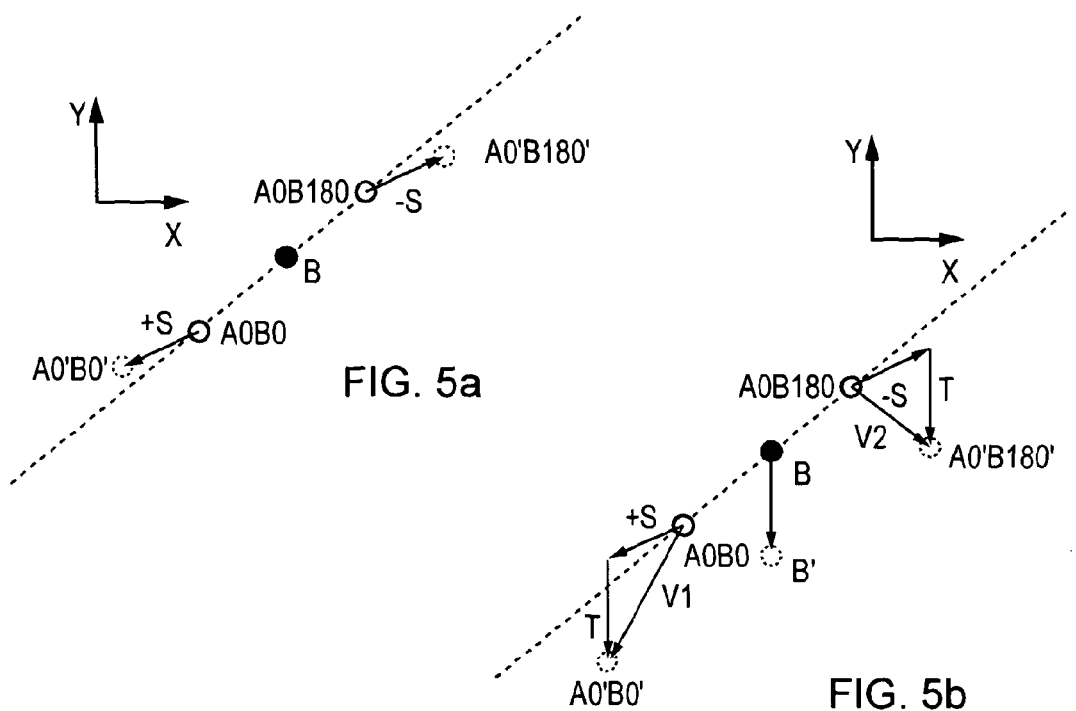
FIG. 5a
FIG. 5b
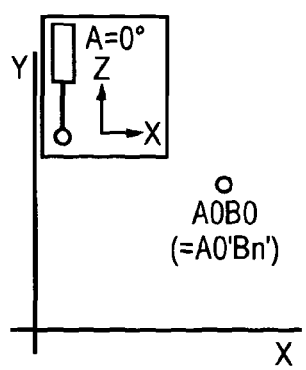
FIG. 5c
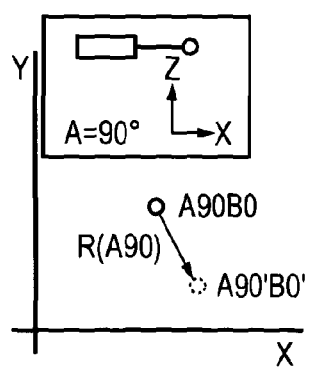
FIG. 5d
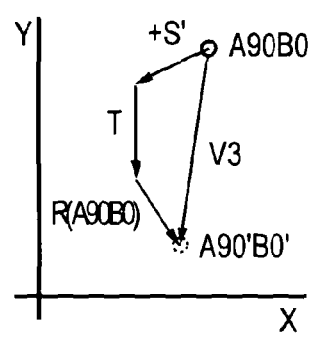
FIG. 5e

METHOD FOR RECALIBRATING COORDINATE POSITIONING APPARATUS

The present invention relates to coordinate positioning apparatus, and in particular to a method for rapidly recalibrating a coordinate measuring machine (CMM) comprising a probe head and a measurement probe.

Various types of coordinate positioning apparatus, such as coordinate measuring machines, machine tools, industrial robots etc, are known. Coordinate positioning apparatus typically includes transducers that measure the position of a moveable platform or quill in a so-called machine (e.g. X, Y, Z) co-ordinate system. The position of points on the surface of an object are measured using a measurement probe that is attached to, and moved around by, the moveable platform or quill. It is also often desirable to mount a measurement probe to the platform of a coordinate positioning apparatus via a probe head that allows the orientation of the measurement probe to be adjusted relative to the quill. In particular, the ability to re-orientate the measurement probe relative to the platform using such a probe head allows the inspection of differently orientated surfaces of an object.

One known type of contact measurement probe used with coordinate positioning apparatus comprises a probe housing and a deflectable stylus. Typically, the probe housing is mounted to the moveable platform or quill of the coordinate positioning apparatus and moved so as to bring the tip of the stylus into contact with the object to be measured. On contacting the object, the stylus deflects away from its so-called undeflected, rest or neutral position with respect to the probe housing and this stylus deflection is sensed by appropriate sensors. Measurement probes of this type may be broadly categorised as either touch trigger probes or scanning probes. Touch trigger probes (also known as digital or switching probes) produce a trigger signal whenever the stylus deflection exceeds a certain threshold. Scanning probes (also known as analogue probes) produce probe output data that is indicative of the magnitude and direction of stylus deflection away from the stylus neutral position; for example, a scanning probe may output measurements of stylus tip deflection in its own local $(a,b,c)$ co-ordinate system.

Irrespective of whether a touch trigger or scanning probe is used, it is necessary to establish the position of the point of the stylus tip that makes contact with an object relative to a known point in the machine co-ordinate system. In other words, the position of the stylus tip when it contacts an object needs to be tied back to an origin or other point that has a known position in machine $(x,y,z)$ coordinates. A calibration process is thus usually performed, typically using a known reference artefact such as a calibration sphere, after a measurement probe is first mounted to coordinate positioning apparatus and whenever the configuration of the coordinate positioning apparatus is altered. This calibration process provides a set of calibration data for use during subsequent position measurements.

For both scanning and touch trigger probes, the calibration process involves a so-called datuming or tip qualification step. The datuming step establishes datum data which typically describes the position of the centre of the stylus tip (when the stylus is in its neutral position) relative to a known point in the machine coordinate system. The datum data may also describe the radius of the ball provided at the stylus tip. For a scanning probe, the calibration process also establishes (in addition to the datum data) a so-called probe transformation matrix that permits stylus deflection measurements taken in the local probe co-ordinate $(a,b,c)$ system to be converted or transformed into deflection measurements in the machine co-ordinate $(x,y,z)$ system. Examples of methods for calibrating scanning probes, including calculation of the probe transformation matrix, are described in detail in WO00/25087 and WO02/073128. Performing such a calibration process typically requires many points to be measured on the surface of a calibration artefact, especially when establishing a probe transformation matrix for a scanning probe, which can be a time consuming process.

The various calibration processes described above generate calibration data that is only valid for the particular orientation of the measurement probe for which it was acquired. If a probe head is used to re-orientate a measurement probe relative to the platform, it is necessary to establish calibration data for each orientation. This can substantially increase the time required for calibration. For example, the PH10 probe head sold by Renishaw plc, Wotton-Under-Edge, Gloucestershire, UK, can be indexed into 720 repeatable orientations and collecting calibration data for each orientation would clearly be a very time consuming task.

Although calibration data is often acquired for each orientation of the measurement probe provided by an indexing probe head, various techniques have been developed to reduce the time required to perform the calibration. For example, calibration data may be collected only for orientations of the measurement probe that are to be used in subsequent measurements. This has the disadvantage that a new calibration process must be performed if measurements are to be acquired using a new probe orientation. It has also been described previously how the task of generating a set of calibration data for a measurement probe when using an indexing head can be simplified somewhat by measuring calibration data at a number of probe orientations and inferring calibration data for other probe orientations from that measured calibration data. For example, EP759534 describe measuring datum data for multiple angular orientations of a measurement probe and inferring datum data for intermediate angular orientations. A method is also outlined in WO2006/114603 for rotating calibration data, such as a probe transformation matrix, calculated at one probe orientation for use at another probe orientation. Methods of inferring calibration data are, however, typically less accurate than direct measurement methods.

It can thus be seen that the need to obtain calibration data for multiple orientations of the measurement probe when using a probe head can increase the length of time required to implement the calibration process. Although methods are known for reducing the time taken to perform a full calibration, e.g. by inferring some of the calibration data from other calibration data, such methods can still be relatively time consuming and may introduce unacceptable levels of measurement inaccuracies in certain circumstances. In some cases, the calibration process can therefore last many minutes or even hours and taking the coordinate positioning apparatus offline to perform the calibration can be disruptive to a production process. This is especially the case if an unexpected event occurs, such as a machine crash that breaks the probe stylus and/or misaligns the probe head, that requires the coordinate positioning apparatus to be recalibrated before measurements can be resumed.

According to a first aspect of the present invention, there is provided a method for recalibrating coordinate positioning apparatus comprising a platform, a measurement probe and a probe head for reorienting the measurement probe relative to the platform, the method comprising the step of taking a calibration data set for the coordinate positioning apparatus that comprises datum data for a plurality of orientations of the measurement probe, the datum data including first datum data for a first nominal orientation of the measurement probe, wherein, after a disturbance to the coordinate positioning apparatus, the method comprises a step of updating the calibration data set, characterised in that the step of updating the calibration data set comprises the steps of acquiring one or more position measurements using the coordinate positioning apparatus, calculating a first correction from the one or more position measurements that describes any change in the first datum data following the disturbance to the coordinate positioning apparatus, and updating the datum data for a plurality of different orientations of the measurement probe using the first correction.

The present invention thus comprises a method for more quickly recalibrating a coordinate positioning apparatus comprising an articulating probe head that carries a measurement probe. Firstly, a set of calibration data is taken that has been established for the coordinate positioning apparatus in the usual manner. In particular, the calibration data set comprises first datum data for a first nominal orientation of the measurement probe and further datum data for further orientations of the measurement probe. For a measurement probe comprising a deflectable stylus having a spherical stylus tip, the datum data for each different orientation may comprise information that describes the position of the centre of the (undeflected) stylus tip relative to a common or fixed point in the machine coordinate system.

After the coordinate positioning apparatus has been subjected to a disturbance or disruption of some type, such as an unexpected machine crash that has misaligned the apparatus and/or broken a probe stylus thereby necessitating stylus replacement, the calibration data set is updated. Instead of acquiring a completely new set of calibration data from scratch as would have been necessary previously, the method of the present invention comprises acquiring one or more position measurements (e.g. measuring the position of a calibration artefact or other feature) and calculating from such position measurements a first correction that describes any change in the first datum data. In other words, position measurements are performed in order to determine any change or shift in the first datum data for the first measurement probe orientation that have arisen from the disturbance to the apparatus. The first correction hence describes the difference between the first datum data as determined during calibration and the new first datum data when the recalibration process is implemented. The first correction is then used (optionally in combination with other correction data as described below) to update the datum data for one or more other orientations of the measurement probe. For example, the first correction may comprise a certain positional shift or offset vector that is then used to update the datum data for other orientations of the measurement probe. For a contact probe having a stylus with a workpiece contacting stylus ball, the first correction may comprise a value describing a change in apparent radius of the stylus ball.

The present invention thus has the advantage that the first offset can be established relatively quickly compared to a full calibration process, yet can provide a (corrected) set of calibration data that are sufficiently accurate for subsequent measurements. The method can also be used with any initial, full, calibration process and has been found to substantially increase the speed of recalibration following a machine crash thereby reducing the machine down time and hence reducing disruption to a production process.

The platform carrying the measurement probe is preferably moveable within the working space of the coordinate positioning apparatus. For example, the platform may comprise a quill that can be moved along three mutually orthogonal (e.g. X,Y,Z) machine axes. The position of the platform may be measured in a machine coordinate system by, for example, position encoders provided on each of the machine axes. The measurement probe preferably has a reference measurement point such as a point located on, or at a certain fixed position relative to, the body of the measurement probe. Position measurements may then be acquired by the measurement probe in a local coordinate system and linked to the reference measurement point that has an invariant position in the local coordinate system. The reference measurement point may define the origin of the local coordinate system of the measurement probe.

The first datum data advantageously comprises a vector or other positional data describing, for the first nominal orientation of the measurement probe, the position of the reference measurement point of the measurement probe relative to a point in the machine coordinate system. The point in the machine coordinate system may, for example, be a point that moves with the platform and is thus known or has a certain relationship to a known or defined point (e.g. an origin) in the machine coordinate system.

Advantageously, the first correction comprises a first offset or first offset vector describing a shift in the reference measurement point of the measurement probe relative to the point in the machine coordinate system for the first nominal orientation of the measurement probe. In other word, the first correction may describe the change or shift in the vector that describes the position of the reference measurement point of the measurement probe relative to a point in the machine coordinate system. It has been found that, to a good approximation, the first offset calculated for the first orientation of the measurement probe is applicable (after appropriate rotation) to all other orientations of the measurement probe that have been previously calibrated. The datum data for one or more different orientations can then be updated using the first offset. In this manner, the previously acquired set of calibration data is adjusted to compensate for the first offset or shift in the reference measurement point of the probe due to the disturbance.

The measurement probe carried by the platform of the coordinate positioning apparatus may be a contact measurement probe or a non-contact (e.g. optical, capacitive, inductive etc) measurement probe. Preferably, the measurement probe comprises a probe housing. The probe housing may include a connector (e.g. a threaded recess or protrusion) for securing the measurement probe to the probe head. The measurement probe preferably comprises a stylus having a substantially spherical stylus tip or ball. The stylus may be deflectable from a neutral position defined relative to the probe housing. Advantageously, the reference measurement point of such a measurement probe comprises the centre of the spherical stylus tip when the stylus is in the neutral position. The step of calculating a first correction may thus comprise measuring the offset in the apparent position of the centre of the spherical stylus tip relative to the position of the centre of the spherical stylus tip previously established during calibration. Advantageously, the datum data for each measurement probe orientation includes a stylus tip radius value. The step of calculating a first correction may then comprise determining a change in stylus tip radius relative to the radius previously established during calibration.

The step of updating the calibration data set is performed after a disturbance to the co-ordinate position apparatus. The disturbance may comprise any event or disruption that affects, or might affect, the calibration of the apparatus. The disturbance may thus comprise the measurement probe unexpectedly crashing into a workpiece, the apparatus being transported or relocated, a change in operating environment etc. The disturbance may also cause misalignment or movement (e.g. rotation or translation) of the articulating probe head relative to the platform on which it is mounted. If a contact probe is provided, the disturbance conveniently comprises replacing the stylus of the measurement probe. For example, such replacement may arise due to breakage (e.g. a machine crash) or wear of the stylus. Preferably, such a stylus replacement step comprises replacing the stylus of the measurement probe with a nominally identical stylus (e.g. a stylus having the same manufacturer's part number and nominal dimensions). The styli may be attached to the measurement probe using a screw thread connection.

The coordinate positioning apparatus may comprise a calibration artefact. Advantageously, the position of the calibration artefact is known. It should be noted that the calibration artefact having a known position may not mean knowing the physical distance (e.g. in centimeters) of the calibration artefact from a certain part of the coordinate position apparatus. The position of the calibration artefact may be known in the sense that it has been defined as a fixed point or origin that all subsequent position measurements taken using the apparatus are tied or linked back to. The calibration data set may, for example, have been established by measurements of the calibration artefact and the calibration artefact may have subsequently remained affixed to the apparatus in the same (hence known) location. In other words, the calibration artefact may have remained affixed to the apparatus in the same location since the calibration process. The position of the calibration artefact may also be known by measuring such an artefact using a different measurement configuration; for example, the coordinate positioning apparatus may comprise one or more additional measurement probes that have not been affected by the disturbance and can therefore still provide calibrated measurements of position.

If the position of the calibration artefact is known, the step of acquiring one or more position measurements using the coordinate positioning apparatus preferably comprises placing the measurement probe in the first nominal orientation and measuring a first apparent position of the calibration artefact. The first correction may then be calculated from the difference between the first apparent position of the calibration artefact and the known (e.g. calibrated) position of the calibration artefact. The first correction may thus comprise a positional difference or vector that describes the apparent shift in position of the calibration artefact. In the above example, this apparent change in position of the calibration artefact thus describes the change in position of the reference measurement point (e.g. stylus tip) of the measurement probe following the disturbance.

If the position of the calibration artefact is known, the step of acquiring one or more position measurements using the coordinate positioning apparatus may further comprise placing the measurement probe in at least one further nominal orientation (e.g. at least a second nominal orientation) and measuring at least one further apparent position (e.g. at least a second apparent position) of the calibration artefact. At least one further correction (e.g. at least one second correction) can then be calculated from the difference between the at least one further apparent position (e.g. the at least one second apparent position) of the calibration artefact and a known position of the calibration artefact for the at least one further measurement probe orientation.

An average correction may be conveniently calculated from the first correction and the at least one further correction. The datum data for a plurality of different orientations of the measurement probe is then preferably updated using the average correction. In this manner, a plurality of corrections (e.g. offset vectors) may be calculated for a plurality of nominal orientations of the measurement probe and an average of such corrections used to correct datum data for multiple different orientations of the measurement probe. An average correction is conveniently calculated in this manner when it is established, or it can be assumed, that there is no substantial movement (e.g. translation/rotation) of the probe head relative to the platform on which it is mounted due to the disturbance to the coordinate measuring apparatus.

The first correction and the at least one further correction may also be used to determine if there has been any rotation and/or translation of the probe head relative to the platform as a result of the disturbance to the coordinate positioning apparatus. In particular, the first correction and the at least one further correction may be used to assess the magnitude of any head rotation and/or translation thereby indicating whether the average correction mentioned above (or even just the first correction) is suitable for correcting datum data for multiple different orientations of the measurement probe. The method may include a further step of calculating a head movement correction from the first correction and the at least one further correction to account for any such rotation and/or translation of the probe head relative to the platform. Such a head movement correction may be used to update the datum data for a plurality of different orientations. In this manner, a plurality of nominal orientations of the measurement probe may be selected to enable separate corrections (e.g. correction vectors) to be calculated for stylus breakage, head rotation and/or head translation.

The present invention can also be employed using a calibration artefact having an unknown position. For example, the calibration artefact may be placed on the apparatus after the disturbance to the coordinate positioning apparatus for the purpose of updating the calibration data set. It is preferred, but not essential, that such a calibration artefact is placed nominally in the same location as the calibration artefact used to establish the calibration data set or in an estimated position. In such an example, the error in the (unknown) position of the calibration artefact is preferably separated from the change in the first datum data. This may be achieved by the step of acquiring one or more position measurements using the coordinate positioning apparatus with the measurement probe placed in at least three different nominal orientations. An apparent position of the calibration artefact can then be measured for each of the at least three different nominal orientations of the measurement probe and the first correction calculated from the at least three apparent positions of the calibration artefact. This technique is described in more detail below.

The calibration artefact may be of any known type. Advantageously, the calibration artefact comprises a sphere. For a spherical calibration artefact, each step of measuring the position of the calibration artefact conveniently comprises measuring a plurality of points on the sphere surface and calculating therefrom the position of the sphere centre. Although a calibration artefact is described above, it should be noted that the recalibration process could alternatively be performed by taking measurements on a part being inspected. For example, points on the part being inspected could be re-measured following the disturbance to obtain the first correction.

The probe head may comprise any known type of probe head. The probe head may comprise an articulating probe head. The probe head may be manually actuated and/or motorised. The probe head preferably allows rotation of the measurement probe relative to the platform about one or more rotary axes or more preferably about two or more rotary axes. In a preferred embodiment, the probe head allows rotation of the measurement probe about two orthogonal rotary axes. The measurement probe and probe head may comprise separate units that can be attached to one another. Alternatively, the measurement probe may be integrated with the probe head.

Advantageously, the probe head comprises an indexing probe head that permits the measurement probe to adopt a plurality of nominally repeatable indexed orientations relative to the platform. In other words, the probe head may allow the measurement probe to be indexed into multiple nominal positions. An example of such an indexing probe is the Renishaw PH10 probe head described above. If an indexing probe head is provided, the calibration data set preferably comprises datum data for a plurality, or for all, of the indexed orientations of the measurement probe relative to the platform. Such datum data may have been separately measured for each nominal orientation, or measured for a subset of nominal orientations and inferred for other orientations. In such an example, the first nominal orientation of the measurement probe preferably comprises one of the indexed positions and the first correction is applied to the datum data for the other indexed positions.

Conveniently, the measurement probe is attached to the platform by a so-called continuous or active probe head. The continuous probe head conveniently allows the measurement probe to be freely rotated or placed into any orientation within a predefined angular range. Preferably, the continuous probe head comprises at least one encoder for measuring the orientation of the measurement probe. The orientation of the measurement probe may be set and fixed prior to measurement or the probe may be reoriented during a measurement (e.g. scanning) procedure. An example of such an active or continuous probe head is the so-called REVO® probe head produced by Renishaw plc.

As outlined above, the first correction is used to update the datum data for a plurality of different measurement probe orientations. Preferably, the first correction is used to update the datum data for all of the different measurement probe orientations contained in the calibration data set. The step of updating the datum data for a plurality of different orientations of the measurement probe using the first correction preferably comprises using a rotation function (e.g. a rotation matrix) to apply the first correction to datum data for different orientations of the measurement probe. For example, the first correction calculated for the first measurement probe orientation may be rotated to different measurement probe orientations. Alternatively, the datum data for different orientation may be rotated to the first orientation, be corrected using the first correction and then rotated back to the original orientation. Advantageously, the method is only applied when small changes to the previous calibration data set are expected (e.g. due to replacing a stylus with a nominally identical stylus). Preferably, the method is used to account for shifts in a measured sphere centre that are substantially less than the shift in sphere centre that occurred as a result of the initial calibration procedure. For example, the method may be used when a measured sphere centre is expected to move (e.g. due to stylus replacement) by no more than 1 mm, more preferably by no more than 500 μm, more preferably by no more than 200 μm, more preferably by no more than 100 μm and more preferably by no more than 50 μm.

The measurement probe used in the method may comprise a touch trigger probe. A touch trigger probe issues a so-called trigger signal whenever its stylus is deflected. Alternatively, the measurement probe may comprise a scanning or analogue probe. A scanning or analogue probe outputs stylus deflection measurements in its local coordinate system. If a scanning or analogue probe is provided, the set of calibration data preferably comprises at least one probe transformation matrix for converting stylus deflection measurements taken in the local coordinate system of the measurement probe into the machine coordinate system. A separate probe transformation matrix may be conveniently provided for each possible orientation, or a sub-set of possible orientations, of the measurement probe relative to the platform. Each probe transformation matrix may be corrected using the calculated first correction. Preferably, the step of updating the calibration data set does not involve updating the probe calibration matrices.

The step of taking a calibration data set may comprise measuring or otherwise calculating a set of calibration data. Advantageously, the step of taking a calibration data set comprises retrieving a previously determined set of calibration data. For example, the set of calibration data may be retrieved from an electronic memory or other data storage area associated with the coordinate positioning apparatus. The set of calibration data may be, or may have been, determined using any appropriate calibration technique. All values in the set of calibration data may have been directly measured, or some of the values may have been inferred from other measurements. The original calibration data set may be stored along with the updated calibration data set. Any subsequent updating process (e.g. due to a further disturbance) is preferably made using the original calibration data set.

According to a second aspect of the present invention, a coordinate positioning apparatus comprises a platform, a measurement probe and a probe head for reorienting the measurement probe relative to the platform, wherein the apparatus comprises a controller that stores a calibration data set for the coordinate positioning apparatus that comprises datum data for a plurality of orientations of the measurement probe, the datum data including first datum data for a first nominal orientation of the measurement probe; wherein, after a disturbance to the coordinate positioning apparatus, the controller is arranged to acquire one or more position measurements using the coordinate positioning apparatus and to calculate therefrom a first correction that describes any change in the first datum data following the disturbance to the coordinate positioning apparatus, the controller also being arranged to update the datum data for a plurality of different orientations of the measurement probe using the first correction.

According to a further aspect of the invention, there is provided a method of recalibration for coordinate positioning apparatus having a measurement probe that can be placed in a plurality of orientations, the method comprising the step of determining a change in datum data for a first orientation of the measurement probe and using the change in datum data to update datum data for at least one different orientation of the measurement probe.

According to a further aspect of the invention, a method for recalibrating coordinate positioning apparatus is provided, the coordinate positioning apparatus comprising a platform carrying a analogue measurement probe having a reference measurement point, the method comprising the steps of;

(a) taking a set of calibration data that includes first datum data acquired with the measurement probe in a first nominal orientation with respect to the platform, the first datum data describing the position of the reference measurement point of the analogue measurement probe relative to a known point in the machine coordinate system, characterised in that the method comprises, after a disturbance to the coordinate positioning apparatus, the steps of;

(b) performing, with the measurement probe placed in the first nominal orientation with respect to the platform, at least one measurement and calculating therefrom a first offset between the reference measurement point of the measurement probe and the previously determined reference measurement point described by the first datum data of step (a), and (c) correcting the set of calibration data of step (a) using the first offset established in step (b) thereby providing an updated set of calibration data that is corrected to account for the effect of the disturbance to the coordinate positioning apparatus.

Figure 2:
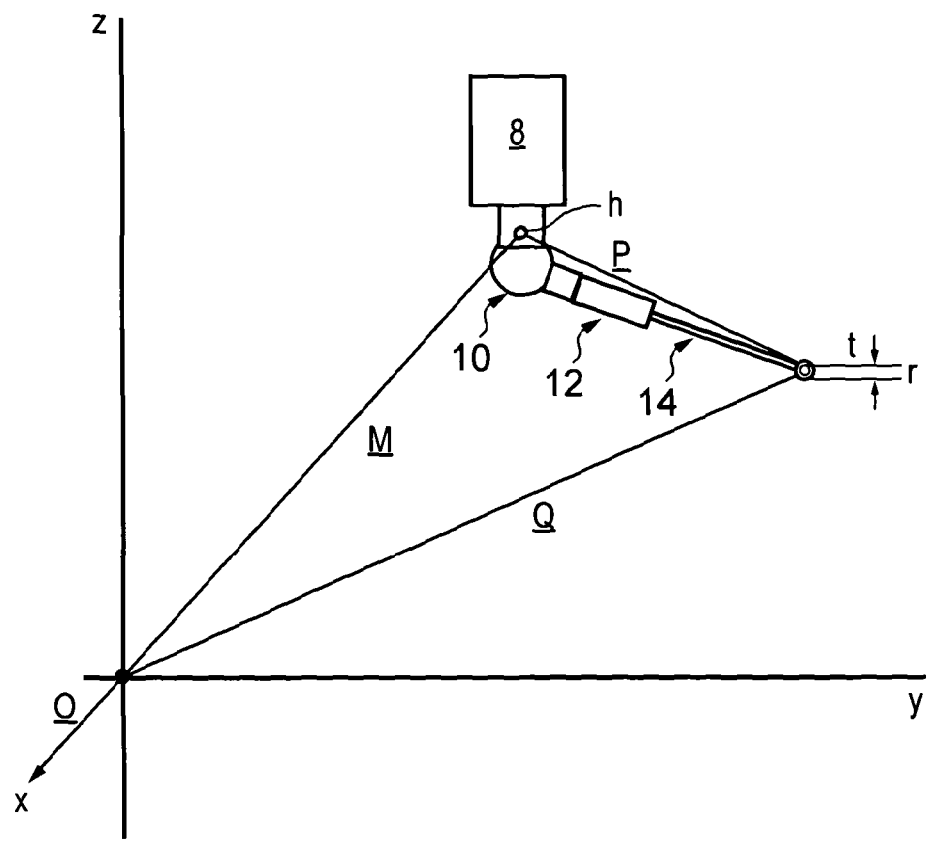
Figure 3:
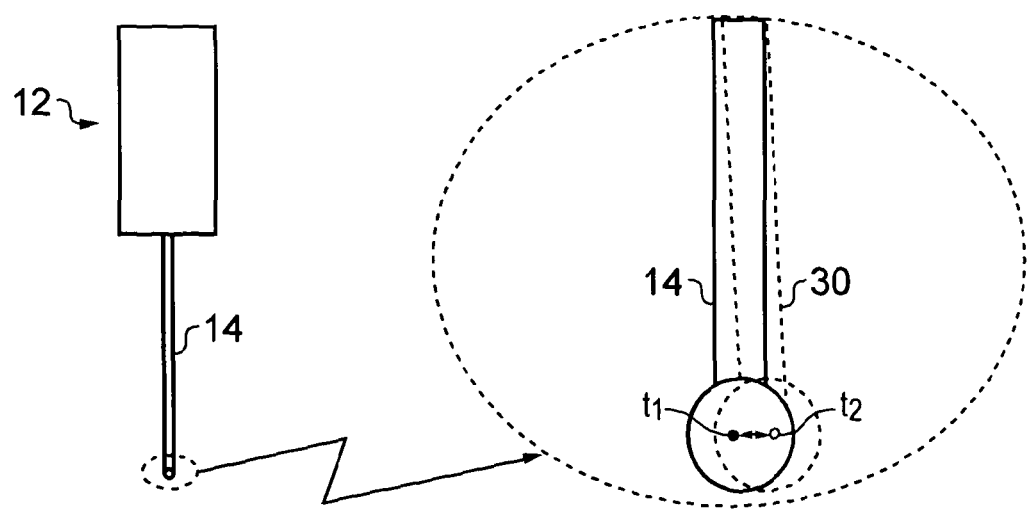
Figure 4A:
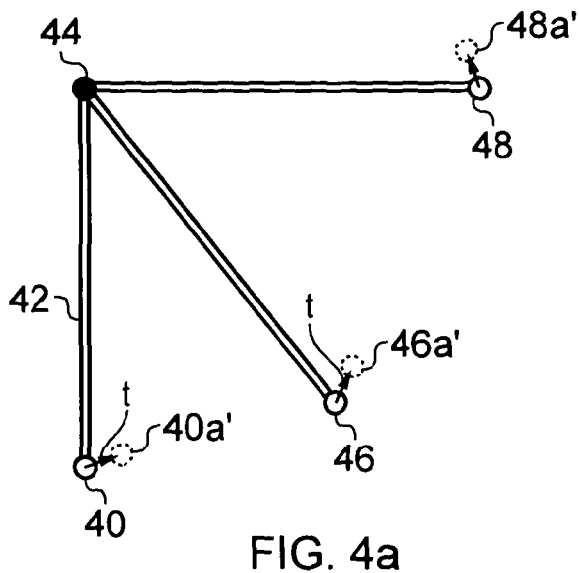
Figure 4B:
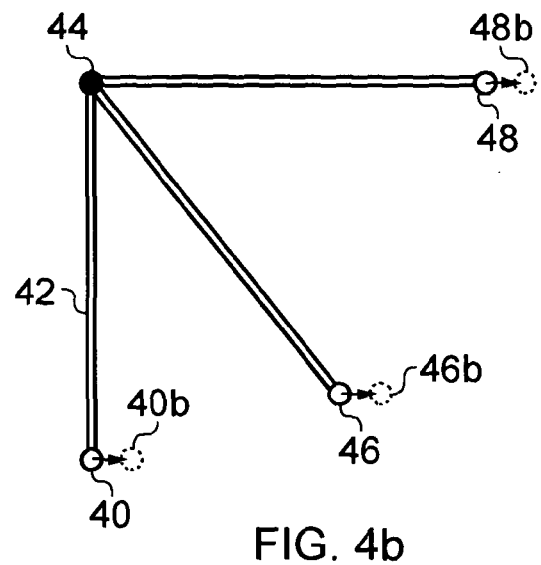
Figure 4C:
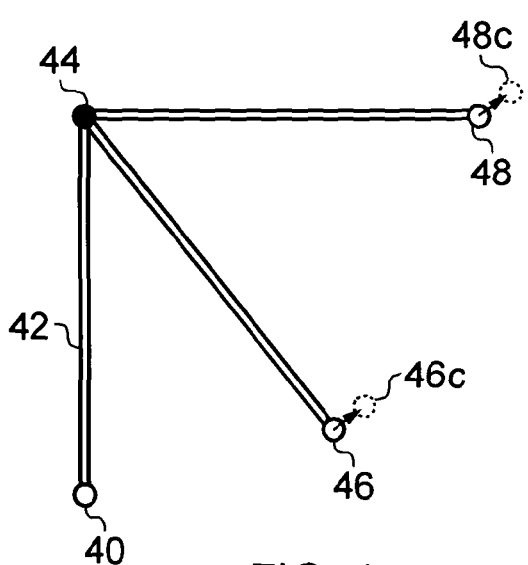

The invention will now be described, by way of example only, with reference to the accompanying drawings in which;

FIG. 1 illustrates a coordinate measuring machine comprising a touch trigger measurement probe and an indexing head, FIG. 2 illustrates the geometry of the CMM of FIG. 1, FIG. 3 shows the offset in stylus tip position resulting from stylus replacement, FIGS. 4a-4c show the different effects of stylus replacement, head translation and head rotation, and FIGS. 5a-5e illustrates a method for separately determining the vectors associated with stylus shift due to stylus replacement, head translation and head rotation.

Referring to FIG. 1, a coordinate positioning apparatus in the form of a coordinate measuring machine (CMM) 2 is shown. The CMM 2 comprises a base or table 4 on which an object (e.g. a workpiece) can be placed and a gantry 6 that is moveable along x and y directions with respect to the base 4. The gantry 6 includes a quill 8 which is moveable along a z direction with respect to the gantry 6. Position encoders are provided on each axis of the CMM 2 to measure the position of the quill in the x, y, and z directions. Measurements of quill position are thus made in the so-called machine co-ordinate (x,y,z) system.

The quill 8 carries an indexing probe head 10, such as a Renishaw PH10 motorised probe head. The indexing probe head 10 comprises a base attachment portion that is attached to the quill 8 and a probe attachment portion that carries a scanning probe 12 having a deflectable stylus 14. The scanning probe 12, which may comprise a Renishaw SP25 probe, includes internal transducers that measure any deflection of the stylus 14 away from a so-called neutral or rest position. Any deflection of the stylus 14 is thus measured by the scanning probe 12 in its local (probe) coordinate (a,b,c) system. To improve the ability to scan complex objects, the indexing probe head 10 allows the scanning probe 12 to be rotated, relative to the quill, about the orthogonal axes A and B and locked in any one of multiple indexed positions. In the case of a Renishaw PH10 probe head, the probe may be indexed into any one of 720 different indexed positions. A controller 16 controls operation of the CMM.

The position of the quill is thus measured in the machine coordinate (x,y,z) system whilst the scanning probe 12 measures stylus deflection in its local probe coordinate (a,b,c) system. In order to use the scanning probe 12 to measure the position of points on the surface of an object in the machine coordinate system, it is necessary to perform a calibration process to establish the various geometrical relationships of the apparatus.

Referring to FIG. 2, a vector diagram is provided to illustrate the position of the stylus tip relative to the CMM quill. A machine vector (M) defines, relative to a fixed point or origin (o) in the machine coordinate system, the position of an arbitrary point (h) on the probe head; the position of point (h) is thus known in the machine coordinate system as it moves with the quill. The point (h) is spaced apart from the centre of the stylus tip (t) by the probe vector (P). The probe vector (P) includes datum data in the form of a datum vector that describes the difference in position between the point (h) and the stylus tip (t) when the stylus is located in its neutral (i.e. undeflected) position.

For a scanning probe, the probe vector (P) also includes a stylus deflection vector that describes any deflection of the stylus tip away from the neutral position. As mentioned above, the measurement of stylus tip deflection away from the rest position are provided by the scanning probe in a local or probe coordinate (a,b,c) system; a so-called probe calibration matrix (C) is thus provided which allows conversion from the probe coordinate (a,b,c) system to provide a stylus deflection vector in machine (x,y,z) coordinates. A resultant tip position vector (Q), which defines the position of the centre of the stylus tip (t) in the machine coordinate system, is thus provided by combining the machine vector (M) and the probe vector (P). The spherical stylus tip that contacts the object to be measured also has a finite radius (r) which is also known and taken into account as appropriate in a known manner.

Prior to measuring an object using a CMM, it is known to perform a series of calibration measurements to establish the calibration data that is necessary to acquire measurements using the CMM. Typically, such calibration measurements involve scanning the surface of a calibration artefact, such as a calibration sphere, that is placed on the bed of the CMM. A wide variety of calibration techniques are known, but the end result of any such calibration process is a set of calibration data that enable the point of contact of the stylus tip on the surface of an object to be determined. The form and/or format of the set of calibration data may vary, but it will necessarily embody the information required to combine the positional (x,y,z) values obtained from the encoders of the CMM with the transducer (a,b,c) readings output by the measurement probe to establish the position of points on the surface of an object being measured in the machine (x,y,z) coordinate system.

One step in the calibration process is so-called probe qualification or probe datuming. Probe datuming is the process by which the positional relationship between a reference measurement point of the measurement probe (e.g. the position (t) of the undeflected stylus tip) is established relative to a known point in the machine coordinate system (e.g. the point (h) on the head that has a known position relative to the origin (o) of the machine coordinate geometry). For example, probe qualification may involve establishing datum data in the form of the stylus deflection vector described above. The datum data may also include a value relating to the radius (r) of the spherical tip of the stylus.

Another step in the calibration process is establishing the three-by-three probe calibration matrix for translating stylus deflections measured in the probe coordinate (a,b,c) system into the machine coordinate (x,y,z) system. The probe matrix may also be found by scanning the surface of a calibration artefact, such as a sphere, and suitable techniques are outlined in WO00/25087 and WO02/073128 the contents of which are hereby incorporated herein by reference. As is apparent from WO00/25087 and WO02/073128, taking the necessary measurements to determine the probe matrix can be a time consuming process.

It additionally has to be remembered that the calibration processes mentioned above are only valid for a single orientation of the measurement probe relative to the quill of the CMM. In other words, if the probe head indexes the measurement probe to another position, it becomes necessary to establish calibration data for that position. As described in EP759534, datum data may be collected at a plurality of orientations and inferred for intermediate orientations. Similarly, as described in WO2006/114603, calibration data such as the probe transformation matrix may be calculated at one or a few orientations and rotated for use in other orientations. Although simplifying the calibration process, such techniques have the disadvantage of reducing measurement accuracy and it can still take many minutes or hours to acquire the measurements and perform the calculations that are necessary to generate the full set of calibration data.

Performing a one-off calibration when commissioning a CMM or a new measurement probe is time consuming, but such an event can be pre-planned to fit in with a production schedule. Furthermore, once calibrated the CMM can be used to acquire measurements for prolonged periods. There are, however, instances where CMM recalibration is suddenly required due to an unexpected disturbance to the machine, such as a crash that breaks a stylus and/or misaligns the probe head. In such cases, the operator is faced with having to take the machine offline in order to perform the recalibration process that is necessary to ensure metrology performance is maintained. This can be seriously disruptive to a production process.

The present inventor has found that, instead of performing a full recalibration, a significantly shorter recalibration process can be performed in circumstances when a previously calibrated machine is subjected to a disturbance. For example, if the stylus of a measurement probe is broken it is possible to replace the broken stylus with a new (e.g. nominally identical) stylus. A measurement may then be performed that establishes the offset between the (undeflected) stylus tip centre positions of the old (e.g. broken) stylus and new stylus. This offset is established using the datum data acquired for the old (e.g. broken) stylus and a new measurement performed with the new stylus as described in more detail below. Importantly, it is not necessary to establish this offset for every indexed position of the probe head. Instead, it is has been found to be sufficient to establish the offset at one, or optionally a few, indexed positions. The offset value may then be used to adjust the set of calibration data to produce an updated or corrected set of calibration data that can be used for taking measurements with the new stylus.

Referring to FIG. 3, the scanning probe 12 described with reference to FIG. 1 is illustrated with its (first) stylus 14 attached. A second, replacement, stylus 30 is also shown in dashed outline.

The CMM is fully calibrated with the first stylus 14 attached to the stylus holder of the scanning probe 12. In other words, a set of calibration data is acquired using the first stylus 14 that comprises datum data and probe transformation matrices for each of the plurality of orientations of the measurement probe that are provided by the indexing probe head. The set of calibration data may take many hours to collect, but it allows subsequent measurements to be acquired with high levels of accuracy.

After breakage and removal of the first stylus 14, for example if the CMM crashes, the second stylus 30 is attached to the stylus holder of the measurement probe. The second stylus 30 is nominally identical to the first stylus 14 but there is still an offset between the centre of the tip (t1) of the first stylus 14 and the centre of the tip (t2) of the second stylus 30. This offset in (undeflected) styli tip position is small, but it is sufficient to degrade measurement accuracy to unacceptable levels.

In the present example of the invention, the measurement probe is placed into a first nominal orientation (e.g. a selected one of the index positions of the probe head) in which first datum data was collected using the first stylus 14 during the previous calibration process. This first datum data describes the tip position t1 that was determined during the datuming process. The offset between the tip positions t1 and t2 can then be established, for example in either of the following two ways.

In a first example, the offset in tip position is determined using a calibration artefact such as a sphere that has a known position in the machine coordinate system. The calibration sphere may have been affixed to the CMM during the initial calibration process and have remained in place during the subsequent measurements; the sphere centre position S that was established during the initial calibration is thus known.

Alternatively, the calibration artefact is placed on the CMM when required and the sphere centre position becomes known by performing a measurement using a different measurement probe and/or stylus combination that has a calibration that has not been affected by the disturbance to the CMM. For example, the measurement probe of the CMM may be of a modular type that includes a retaining module and a stylus module. Various stylus modules (e.g. having different stylus configurations, lengths, spring forces etc) can be provided that are separately attachable to the retaining module in repeatable positions. For such a modular measurement probe, it is necessary to perform a separate calibration process for each stylus module combination. If one of the stylus modules needs to be replaced or reconfigured (e.g. due to a broken styli) it is possible to use another stylus module for which the calibration remains valid to establish the position of the sphere centre. This allows the calibration artefact to be removed from the machine after the initial calibration and only replaced on the CMM (preferably in nominally the same position that was used during calibration) when the recalibration process is to be performed. It should be noted that if the probe head is misaligned due to a disturbance (crash etc) this will affect the calibration of all probes mounted thereon typically making it necessary, if the sphere centre is unknown, to use the alternative recalibration procedure described below that does not need knowledge of actual sphere position.

In a simple example, the known or calibrated sphere centre position (S) is related to the apparent or remeasured sphere centre position (C) by the expression;

$$\vec{C} - \overrightarrow{P_{current}} = \vec{S} - \overrightarrow{P_{real}} \qquad (1)$$

where $P_{current}$ is the probe vector of the current calibration (i.e. the calibration previously performed using the old, now broken, stylus) and $P_{real}$ is the actual or real probe vector (i.e. the unknown probe vector that is associated with the new stylus).

If follows from equation (1) that $P_{real}$ is given by:

$$\overrightarrow{P_{real}} = \vec{S} - \vec{C} + \overrightarrow{P_{current}} \quad (2)$$

It can thus be seen from equation (2) that the offset or change in probe vector resulting from replacing the broken stylus can be found from the apparent change in position of a sphere of known position.

If, as in the present example, the measurement probe is carried by an articulating probe head, the probe vector (P) can also be rotated by the head angles. For a two-axis rotary head (i.e. an articulating probe head that allows the measurement probe to be rotated about an A-axis and a B-axis that is substantially orthogonal to the A-axis) a probe vector $P_{0,0}$ can be defined for the A0B0 orientation (i.e. the probe head orientation where the A-axis is rotated to 0° and the B-axis is also rotated to 0°). A probe vector $P_{A,B}$ may then be found for any other probe head orientation from the probe vector $P_{0,0}$ rotated by the head angle (A,B) as follows:

$$\overrightarrow{P_{A,B}} = \left[Rot_B^{\vec{Z}}\right] \times \left[Rot_A^{\vec{X}}\right] \times \overrightarrow{P_{0,0}} \quad (3)$$

When the head is placed in the orientation AB, equation (2) thus becomes;

$$\overrightarrow{P_{real(0,0)}} = \quad (4a)$$
$$\left[\left[Rot_B^{\vec{Z}}\right] \times \left[Rot_A^{\vec{X}}\right]\right]^{-1} \times \left(\vec{S} - \vec{C}\left[Rot_B^{\vec{Z}}\right] \times \left[Rot_A^{\vec{X}}\right] \times \left(\overrightarrow{P_{current(0,0)}}\right)\right)$$

which simplifies to:

$$\overrightarrow{P_{real(0,0)}} = \left[\left[Rot_B^{\vec{Z}}\right] \times \left[Rot_A^{\vec{X}}\right]\right]^{-1} \times (\vec{S} - \vec{C}) + (\overrightarrow{P_{current(0,0)}}). \quad (4b)$$

Equation (4b) thus describes how the positional difference between the known sphere centre (S) and apparent sphere centre (C) at a certain probe head orientation AB, can be rotated back to find the probe offset vector at the A0B0 orientation. The probe offset vector derived from equation (4b) can then be used in equation (3) to find the probe offset vector at any orientation AB.

It should be noted that a probe offset vector (i.e. a positional difference between apparent and actual sphere centre positions) may be calculated for more than one orientation of the probe head. The probe offset vector may then be averaged, after applying appropriate rotations, to provide a resultant offset vector that has reduced measurement uncertainty. As described below, a plurality of probe offset vectors may also be used to establish if there has been any rotation or translation of the probe head relative to the quill as a result of the disturbance to the CMM. It is, however, clearly preferred to measure the offset at no more than a few probe head orientations otherwise the measurement speed advantages of the present invention compared with a full redatuming procedure at each required orientation are negated.

In a second example, the offset in tip position is determined using a calibration artefact such as a sphere that has an unknown position in the machine coordinate system. This may comprise, for example, a sphere that is placed on the bed of the CMM following stylus replacement (e.g. due to stylus breakage) for the recalibration process. As the sphere centre (S) is not known, the offset in the probe vector due to the new styli ($P_{offset}$) is determined from three measurements of is apparent sphere centre (C) that are taken with the probe head placed in three different orientations. This provides the following three geometrical expressions describing the difference between the real (unknown) position of the sphere and the apparent sphere position:

$$\begin{cases} \overrightarrow{C_{0,0}} + [R_{0,0}] \times \overrightarrow{P_{offset}} = \vec{S} \\ \overrightarrow{C_{90,0}} + [R_{90,0}] \times \vec{P}_{offset} = \vec{S} \\ \overrightarrow{C_{90,90}} + [R_{90,90}] \times \vec{P}_{offset} = \vec{S} \end{cases} \quad (5)$$

where S is the unknown real sphere position, $C_{0,0}$ is the apparent sphere position when measured at the A0B0 orientation, $C_{90,0}$ is the apparent sphere position when measured at the A90B0 orientation, $C_{90,90}$ is the apparent sphere position when measured at the A90B90 orientation, R0,0 is the rotation matrix from the A0B0 orientation (Identity), R90,0 is the rotation matrix from the A0B0 orientation to the A90B0 orientation, R90,90 is the rotation matrix from the A0B0 orientation to the A90B90 orientation and $P_{offset}$ is the offset of the probe vector.

By subtraction of the above equations (5), the unknown sphere centre location (S) is eliminated as follows:

$$\begin{cases} \overrightarrow{C_{90,0}} - \overrightarrow{C_{0,0}} + ([R_{90,0}] - [R_{0,0}]) \times \overrightarrow{P_{offset}} = \vec{0} \\ \overrightarrow{C_{90,90}} - \overrightarrow{C_{0,0}} + ([R_{90,90}] - [R_{0,0}]) \times \overrightarrow{P_{offset}} = \vec{0} \end{cases} \quad (6)$$

By addition of the equations (6), the offset of the probe vector can be seen to be:

$$\overrightarrow{P_{offset}} = -([R_{90,90}] + [R_{90,0}] - 2[R_{0,0}])^{-1} \times \left(\overrightarrow{C_{90,90}} - \overrightarrow{C_{90,0}} - 2\overrightarrow{C_{0,0}}\right) \quad (7)$$

It should be noted in order to calculate the probe vector offset ($P_{offset}$) of equation (7), the three head orientations are chosen so that the matrix (R3+R2−2R1) can be inversed. The above example uses three orientations along three orthogonal axes which has been found to provide the best configuration in terms of sensitivity to noise.

The offset of the probe vector ($P_{offset}$) calculated in this manner may then be used to correct probe vectors at multiple different orientations of the measurement probe; this may be achieved using an expression analogous to equation (4) but with $P_{offset}$ as defined in equation (7) substituted for the sphere centre difference S−C.

The above examples outline how to establish an offset in the probe vector following a disturbance to the CMM and, in particular, describe how such a recalibration process is performed after a broken stylus is replaced. If a stylus is replaced, the new stylus is likely to have a stylus tip of a radius nominally identical to the stylus it replaces. In such an instance, the method can optionally also include a step of calculating the change in stylus tip radius to account for the new stylus tip radius and subsequently apply that change in tip radius to other orientations.

The disturbance to the CMM may result only in a broken stylus that needs to be replaced. It is, however, possible that the disturbance could (e.g. if it comprises an impact) additionally or alternatively result in the probe head becoming misaligned in some way relative to the platform or quill to which it is mounted. In other words, there may be some displacement or twisting of the probe head relative to the quill as a result of the disturbance to the CMM. In the simplest terms, it is possible to describe any such disturbance to the probe head as a probe head translation and/or a probe head rotation. The different results of the disturbance (e.g. stylus replacement, head translation, head rotation) can be distinguished, and optionally compensated for as necessary, in the manner described below.

Referring to FIG. 4a, the effect of stylus replacement alone is shown. In particular, FIG. 4a shows a first apparent ball position 40 of a stylus ball located at the distal end of a stylus stem 42. The probe head of the CMM (not shown) can rotate the stylus of the probe about an axis of rotation 44 into a second apparent ball position 46 and a third apparent position 48. If the stylus is replaced, the new centre of the stylus ball may be shifted by a small offset that is invariant in the stylus coordinate geometry. As can be seen in FIG. 4a, the effect of this offset is to provide a shifted first apparent ball position 40a, a shifted second apparent ball position 46a and a shifted third apparent ball position 48a for the three illustrated angles of probe head rotation. As described above, a probe offset vector may thus be measured at one head orientation and used (after appropriate rotation) to correct the shift in apparent ball position at other orientations by updating the associated datum data.

FIG. 4b shows the effect of only a linear translation along one axis (in this example the x-axis) of the probe head relative to the quill of the CMM. There is no shift in stylus ball position in the stylus coordinate geometry because of this translation, but each apparent ball position is translated by a constant amount along the x-axis of the quill coordinate system. In other words, the probe head translation provides a shifted first apparent ball position 40b, a shifted second apparent ball position 46b and a shifted third apparent ball position 48b for the three illustrated angles of probe head rotation.

Turning next to FIG. 4c, the effect of only rotating (e.g. twisting) the probe head relative to the quill of the CMM is shown. This twisting effect may arise, for example, from a disturbance that causes rotation at the mount which attaches the probe head to the quill. The effect of probe head rotation is to introduce a shift in the apparent ball position (i.e. a shift relative to the ball position as established prior to the head rotation) that has a magnitude that is dependent on the angle adopted by the probe head. In the example shown, the head rotation does not affect the first apparent ball position 40, but it produces a slightly shifted second apparent ball position 46c and a significantly shifted third apparent ball position 48c (noting that the illustrated shifts in apparent ball position occur out of the plane of the page).

It can be seen from FIGS. 4a-4c that changing the stylus, probe head translation and probe head rotation have different effects on the shift in apparent stylus ball position (i.e. the probe offset vector) that occurs as a function of probe head angle. Measuring the probe offset vector (defined in the probe or stylus geometry system) at a plurality of different head orientations can thus be used to assess what effect the disturbance has had on the CMM. Preferably, the different head orientations are separated by a wide angular range.

If the measured probe offset vector is the same (in the probe coordinate system) at a plurality of such different probe head orientations, it can be assumed that there has been no significant rotation or translation of the probe head. An average of the probe offset vector can thus be applied (after appropriate rotations) to correct the datum data at each required orientation of the probe head.

If the probe offset vector has a similar magnitude at different head orientations but a direction (in the probe coordinate system) that varies in a predictable manner, then it can be determined that a translation of the probe head has resulted from the disturbance to the CMM. Furthermore, if the probe offset vector varies in both magnitude and direction (in the probe coordinate system) then rotation of the probe head is likely to have occurred due to the disturbance. If a calibration artefact of known position is present on the CMM, any such probe head translation or rotation can be assessed by taking further measurements of that artefact. In particular, a probe offset vector may be measured with the probe head rotated into multiple different angular orientations. Analysis of the various probe offset vectors may then be used to extract information on the probe head rotation and/or translation. In some instances (e.g. for very high accuracy applications), it may also be preferable to dispense with the rapid recalibration process of the present invention if significant rotation or translation of the probe head has occurred and instead repeat the full calibration process. At the other extreme, if the amount of probe head translation and/or rotation is small, an average of the probe offset vector measured at multiple angles may simply be applied to the datum data for all head angles.

The above examples described with reference to FIGS. 4a-4c are illustrated in two dimensions for ease of understanding. The skilled person would appreciate that there could be translation of the probe head along any one or more of the three translational degrees of freedom relative to the quill and/or rotation of the probe head about any one or more of the three rotational degrees of freedom relative to the quill. The probe head also preferably includes two rotational axes as describe above, and any variations are preferably measured with the probe head rotated into different positions about each of the two rotational axes.

Referring next to FIGS. 5a to 5e, a method will be described for ascertaining the separate vector contributions to the probe offset vector that arise from changing the stylus, translation of the probe head and rotation of the probe head.

FIG. 5a shows an X-Y plane in the CMM geometry system. The X-Y plane is located at a height along the z-axis that intersects the centre of the stylus ball. In FIG. 5a the probe head holds the stylus so that it points vertically downwards in the A0 orientation; i.e. the angle of rotation about the A-axis is 0°, the A-axis being the angle of head rotation illustrated in FIG. 1.

In FIG. 5a, the vector S denotes the change in stylus ball position that occurs when the stylus is replaced. In FIG. 5a, it is assumed that the only effect arising from the disturbance to the probe head is the shift in stylus ball position arising from stylus replacement (e.g. due to stylus breakage). It can thus be seen that in the A0B0 orientation the effect of stylus replacement is to shift the apparent ball position to A0'B0'; this is a shift by the vector +S. If the stylus is now rotated 180° about the B-axis, it can be seen that there will be a vector shift of −S between the original (previously calibrated) stylus ball position A0B180 and the new position A0'B180' adopted by the ball of the replacement stylus. Importantly, it is noted that the vector +S describing the offset for the B0 orientation is equal and opposite (in the machine coordinate geometry) to the vector −S describing the offset for the B180 orientation. The vector S is, of course, invariant in the stylus co-ordinate system.

FIG. 5a thus shows the effect of purely replacing a (e.g. broken) stylus with no associated probe head rotation or translation. Turning next to FIG. 5b, the additional effect of a translation of the probe head in the X-Y plane is shown. Unlike the stylus replacement vector S, the probe head translation vector T does not vary with the angle of B-axis rotation. Instead, the translation vector T has the same magnitude and direction, in the illustrated machine co-ordinate system, at each angle of probe head rotation about the B-axis.

FIG. 5b thus shows the additional effect of a head translation vector T to the stylus replacement vector S shown in FIG. 5a. A new apparent ball position A0'B0' following the disturbance is thus shifted from the previous (calibrated) ball position A0B0. The difference between the positions A0B0 and A0'B0' can be described by a vector V1 that is the resultant of the head translation vector T and the stylus replacement vector +S. For a rotation about the B-axis of 180°, it can be seen that the original ball position A0B180 is shifted to A0'B180' by a resultant vector V2. The vector V2 is the resultant of the head translation vector T and the stylus replacement vector −S; −S being of equal magnitude but opposition direction to the vector +S of the B0 orientation.

Mathematically, the resultant vectors V1 and V2 can be described as:

$$V1 = T + S \quad (8a)$$

$$V2 = T - S \quad (8b)$$

Half of the sum of V1 and V2 thus yields the head translation vector T, whereas half of the difference between the vectors V1 and V2 provides the stylus replacement vector S. In this manner, measurements of the resultant probe offset vectors V1 and V2 at orientations about the B-axis separated by 180° allows the head translation vector T and stylus replacement vector S to be found. It can also be seen that if the head translation vector T is zero (i.e. there was no translation resulting from the disturbance) the vectors V1 and V2 will be equal and opposite as they will only include the stylus replacement vectors −S and +S as shown in FIG. 5a; the presence or absence of probe head translation can thus be quickly identified. It should be noted that the above is based on the assumption that any probe head translation resulting from the disturbance is only in the x-y plane. The stylus replacement vector S could, however, include z-axis components that will be invariant for different B-axis orientations when the probe head is in the A0 orientation.

As illustrated in FIG. 5C, any rotation of the probe head resulting from the disturbance has negligible effect on the apparent stylus ball position when the probe head is in the A0 orientation. This is based on the assumption that the disturbance results in the probe head being rotated about an axis at least approximately parallel to, and coincident with, the B-axis of rotation provided by the probe head. In particular, FIG. 5C illustrates how the apparent stylus ball position is not affected for A0 head angles if the only disturbance to the CMM is a rotation of the probe head. In other words, the apparent stylus ball position A0'Bn' is invariant for any angular value of n (e.g. for n=0 to 360°). It can thus be seen that any rotation of the probe head resulting from the disturbance does not substantially affect the head translation vector T and the stylus replacement vector S that are extracted using the method described above with reference to FIG. 5b. It should be noted that if the probe head rotation due to the disturbance is not coincident with the B-axis, the rotation effect can still be corrected but additional measurements may be required at A0B0 and A0B180 to isolate any translation due to the offset in the axis of rotation.

FIG. 5D shows how any rotation of the probe head resulting from the disturbance does effect the apparent stylus ball position when the probe head is in the A90 orientation (i.e. the orientation in which the stylus is held horizontal). In particular, a rotation vector R(A90B0) for the head orientation A=90°, B=0° is shown in FIG. 5D; this vector describes the shift in apparent stylus ball position from A90B0 to A90'B0'. In the illustration of FIG. 5D, it is assumed that the only effect of the disturbance is a pure rotation of the probe head. The vector R(A90B0) can also be rotated about the B-axis by applying a rotation function; for example, R(A90B0) can be rotated into an arbitrary vector R(A90Bn) in the same x-y plane, where n is any angle between 0° and 360°, by multiplication with a suitable rotation matrix.

Referring finally to FIG. 5E, the combined effect of stylus replacement, head translation and head rotation on the apparent stylus ball position is shown when the probe head is placed in the A90B0 orientation. In particular, the resultant stylus ball offset vector V3 is then made up of the vector addition of the head translation vector T, the stylus replacement vector S' and the head rotation vector R(A90B0).

The head translation vector T is known from the method described with reference to FIG. 5b and is invariant with A-axis orientation. The stylus replacement vector S' at the A90B0 orientation can be found by applying an appropriate rotation to the stylus replacement vector S that was derived for the A0 orientation using the method described above with reference to FIG. 5b. Measurement of the resultant vector V3 thus permits the head rotation vector R(A90B0) to be found.

The effect of the head rotation vector R on the change in stylus ball position is at its maximum for the A90 orientation and substantially zero for the A0 orientation. The effect of the head rotation vector on apparent sphere position varies sinusoidally between the A90 maximum and the A0 minimum. It is thus possible, after finding the vector R(A90B0), to establish a head rotation vector R for any A-axis orientation (at B0) by the following relationship:

$$R(a) = R(A90) \cdot \mathrm{Sin}(a) \quad (9)$$

where a is the angular orientation of the A-axis of the probe head. As mentioned above, the direction (but not magnitude) of the head rotation vector R will also vary in a known manner with B-axis angle for a given A-axis orientation. The head rotation vector R can thus be determined at any angle about the A-axis and B-axis.

The above described method thus allows the effect of stylus replacement, head rotation and head translation to be separately found by measuring three resultant probe offset vectors (V1, V2 and V3). Once these constituent contributions to the probe offset vector have been determined, such constituent vectors can be used (applying any appropriate rotations) to correct the stylus ball position at any desired orientation of the probe head. In this manner, the datum data can be corrected for multiple different orientations of the measurement probe.

It should also be noted that the above examples describe taking measurements on a calibration artefact during the recalibration procedure. In some instances, the same calibration artefact may be used during the initial calibration process and the recalibration procedure. It would, however, also be possible to perform the recalibration process using a different calibration artefact to that which was used during the initial calibration procedure. It should also be noted that the use of a calibration artefact may be dispensed with altogether and a workpiece or part that is being inspected using the CMM or a feature of the CMM could be used for the recalibration procedure. For example, the recalibration process could be performed using the part on which the stylus broke during measurement. This may, for example, involve re-measuring points along the x, y, and z axes of the part to acquire the three offset values required to describe the offset of the probe vector. If other, calibrated, measurement probes or styli are available for measurement the recalibration process may then comprise comparing measurement taken on the part with a calibrated measurement probe configuration with those acquired using the measurement probe configuration that is being recalibrated in order to ascertain the probe vector offset.

Once the probe vector offset has been calculated as described above, it is used to correct the set of calibration data that was previously acquired. In particular, the probe vector for each orientation of the measurement probe may be adjusted to include the offset in the probe vector. Similarly, if the calibration data includes stylus tip radius data for each orientation of the measurement probe, this may be updated for each orientation using a measured change in stylus tip radius. All the calibration data may be corrected upfront and the corrected data stored, or the corrections may be calculated and applied only as and when required. In the case of a scanning probe, the probe calibration matrices are preferably unaltered by the recalibration process.

The present invention thus allows a quick recalibration of a CMM probe following a crash and in particular overcomes the need to immediately perform a full calibration process from scratch. Instead, enough datum data is collected to correct the set of calibration data already associated with the CMM thereby allowing the system to rapidly resume measurement operations.

Following the recalibration process, a self-checking procedure may be performed to verify that the recalibration process has been successful. This may comprise, for example, measuring the position of a calibration artefact (e.g. the centre of a calibration sphere) a plurality of times with the measurement probe placed in different orientations by the probe head. If the recalibration process has been successful, the position of the calibration artefact should be the same (within the desired accuracy limits of the apparatus) for each measurement.

Although a scanning or analogue probe is described in the examples outlined above, the skilled person would recognise that the method is equally applicable to touch trigger probes, such as the Renishaw TP20 or TP200 probes. A separate measurement probe and probe head are described above, but the method could also be implemented using a measurement probe formed integrally with a probe head. Furthermore, the above examples include an indexing probe head that can adopt a plurality of repeatable indexed positions. It would, however, also be possible to use a probe head of any type. In particular, a so-called continuous or active probe head could be used which provide continuous rotation of the measurement probe about one or more axes and also includes encoders to measure the angle through which the measurement probe is rotated. Although the above examples include probes having a styli for contacting an object, the method of the present invention could also be applied using non-contact measurement probes. Such non-contact (e.g. capacitive or optical) measurement probes may include a reference measurement point located at a certain point (e.g. the origin) of the non-contact measurement system.

The invention claimed is:

1. A method for measuring an object using a coordinate positioning apparatus comprising a platform, a measurement probe having a replaceable stylus, and a probe head for reorienting the measurement probe relative to the platform, the method comprising the steps of:
   (i) taking a first calibration data set for the coordinate positioning apparatus that comprises datum data for a plurality of orientations of the measurement probe, the first calibration data set defining a calibration of the coordinate positioning apparatus when the measurement probe comprises a first stylus, and the datum data including first datum data for a first nominal orientation of the measurement probe;
   (ii) replacing the first stylus of the measurement probe with a second stylus that is nominally identical to the first stylus;
   (iii) updating the first calibration data set to generate a second calibration data set that defines the calibration of the coordinate positioning apparatus when the measurement probe comprises the second stylus, the step (iii) comprising the steps of:
      (a) using the coordinate positioning apparatus to acquire one or more position measurements,
      (b) calculating a first correction from the one or more position measurements, the first correction describing any change in the first datum data following the replacement of the first stylus with the second stylus, and
      (c) updating the datum data for a plurality of different orientations of the measurement probe using the first correction to thereby generate the second calibration data set; and
   (iv) using the coordinate positioning apparatus, with the second calibration data set, to measure an object.

2. A method according to claim 1, wherein:
   the platform is moveable in a machine coordinate system and the measurement probe has a reference measurement point;
   the first datum data comprises a vector describing the position of the reference measurement point of the measurement probe relative to a point in the machine coordinate system for the first nominal orientation of the measurement probe; and
   the first correction comprises a first offset vector describing a shift in the reference measurement point of the measurement probe relative to the point in the machine coordinate system for the first nominal orientation of the measurement probe.

3. A method according to claim 2, wherein the measurement probe comprises a probe housing, the first and second styluses each have a substantially spherical stylus tip, each of the first and second styluses is deflectable from a neutral position, and the reference measurement point of the measurement probe comprises the centre of the spherical stylus tip when one of the first and second styluses is in the neutral position.

4. A method according to claim 1, wherein:
   the coordinate positioning apparatus comprises a calibration artefact of known position; and
   the step (a) further comprises placing the measurement probe in the first nominal orientation and measuring a first apparent position of the calibration artefact, the first correction being calculated from the difference between the first apparent position of the calibration artefact and the known position of the calibration artefact.

5. A method according to claim 4, wherein:
the step (a) further, comprises placing the measurement probe in at least one further nominal orientation and measuring at least one further apparent position of the calibration artefact;
at least one further correction is calculated from the difference between the at least one further apparent position of the calibration artefact and the known position of the calibration artefact; and
an average correction is calculated from the first correction and the at least one further correction, the datum data for a plurality of different orientations of the measurement probe being updated using the average correction.

6. A method according to claim 4, wherein:
the step (a) further comprises placing the measurement probe in at least one further nominal orientation and measuring at least one further apparent position of the calibration artefact;
at least one further correction is calculated from the difference between the at least one further apparent position of the calibration artefact and the known position of the calibration artefact; and
the first correction and the at least one further correction are used to determine if there has been any rotation and/or translation of the probe head relative to the platform as a result of replacing the first stylus of the measurement probe with the second stylus.

7. A method according to claim 6, comprising the step of calculating a head movement correction to account for any rotation and/or translation of the probe head relative to the platform, wherein the head movement correction is used to update the datum data for a plurality of different orientations.

8. A method according to claim 4, wherein:
the calibration artefact comprises a sphere; and
the measurement of the first apparent position of the calibration artefact comprises measuring a plurality of points on the sphere surface and calculating therefrom the position of the sphere centre.

9. A method according to claim 4, wherein the first calibration data set was previously established by measuring the calibration artefact, the calibration artefact having remained affixed to the coordinate positioning apparatus in the same location since calibration.

10. A method according to claim 1, wherein:
the coordinate positioning apparatus comprises a calibration artefact located in an unknown position;
the step (a) comprises placing the measurement probe in at least three different nominal orientations and measuring an apparent position of the calibration artefact for each of the at least three different nominal orientations of the measurement probe; and
the first correction is calculated from the at least three apparent positions of the calibration artefact.

11. A method according to claim 1, wherein the probe head comprises an indexing probe head that permits the measurement probe to adopt a plurality of nominally repeatable indexed orientations relative to the platform.

12. A method according to claim 1, wherein the probe head comprises a continuous probe head that allows the measurement probe to be freely rotated into different orientations, the continuous probe head comprising at least one encoder for measuring the orientation of the measurement probe.

13. A method according to claim 1, wherein the step (c) comprises using a rotation function to apply the first correction to datum data for different orientations of the measurement probe.

14. A method according to claim 1, wherein:
the measurement probe comprises an analogue probe;
the first and second calibration data sets each comprise at least one probe transformation matrix for converting measurements taken by the analogue probe in a local coordinate system into measurements in a machine coordinate system; and,
the at least one probe transformation matrix remains unaltered during the step (c).

15. A method according to claim 1, wherein the measurement probe comprises a touch trigger probe.

16. A method according to claim 1, wherein the step (i) comprises retrieving a previously determined set of calibration data.

* * * * *